US 6,341,133 B1

(12) United States Patent
Kawamoto et al.

(10) Patent No.: US 6,341,133 B1
(45) Date of Patent: *Jan. 22, 2002

(54) INFORMATION PROVIDING APPARATUS AND PORTABLE COMMUNICATION TERMINAL

(75) Inventors: Yoji Kawamoto, Tokyo; Akira Kurihara, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,002

(22) PCT Filed: Oct. 9, 1996

(86) PCT No.: PCT/JP96/02935

§ 371 Date: Jun. 11, 1997

§ 102(e) Date: Jun. 11, 1997

(87) PCT Pub. No.: WO97/14244

PCT Pub. Date: Apr. 17, 1997

(30) Foreign Application Priority Data

Oct. 11, 1995 (JP) ............................................. 7-263187

(51) Int. Cl.$^7$ ........................... H04M 11/08; H04Q 7/04
(52) U.S. Cl. ...................... 370/401; 370/465; 370/466; 370/352; 455/556
(58) Field of Search ................................. 370/238, 401, 370/465, 466, 352; 455/550, 556, 461; 709/203, 206, 227, 228

(56) References Cited

U.S. PATENT DOCUMENTS 5,285,494 A 2/1994 Sprecher et al.

(List continued on next page.)

FOREIGN PATENT DOCUMENTS

AU 52144/93 7/1994

(List continued on next page.)

OTHER PUBLICATIONS

Masayoshi Shikano "Mobile Computing Makes a Difference in Competition. That's Why PHS!" Business Communication, vol. 32, No. 9, Sep. 1, 1995, pp. 16–24.

(List continued on next page.)

Primary Examiner—Wellington Chin
Assistant Examiner—Frank Duong
(74) Attorney, Agent, or Firm—Frommer Lawrence & Haug LLP; William S. Frommer; Bruno Polito

(57) ABSTRACT

A portable communication terminal for use in a communication system including the terminal and a terminal server, and an implementation of such a communication system. The communication terminal has a telephone communication means operable to accesses a server and/or a data base connected to a portable telephone system network so as to receive multimedia information from the server and/or data base, and a human-machine interface means operable to receive multimedia information supplied from the telephone communication means. The communication terminal server has an external communication processing means operable to accesses an external server connected to an external information communication network so as to receive multimedia information from the external server, a data processing means for processing or converting multimedia information received from the external communication processing means, and a transfer means for transferring multimedia information from the external communication processing means and/or the data processing means to the portable communication terminal via said portable telephone system network. Communication between the external communication processing means and the external server is carried out using a Transmission Control Protocol/Internet Protocol (TCP/IP) as an administrative protocol and using a Hypertext Transfer Protocol (HTTP) as an application protocol.

8 Claims, 14 Drawing Sheets

U.S. PATENT DOCUMENTS

| | | | |
|---|---|---|---|
| 5,446,736 A | | 8/1995 | Gleeson et al. |
| 5,493,692 A | * | 2/1996 | Theimer et al. ............ 455/461 |
| 5,497,396 A | | 3/1996 | Delprat |
| 5,699,244 A | * | 12/1997 | Clark, Jr. et al. ........... 364/420 |
| 5,742,845 A | * | 4/1998 | Wagner ...................... 709/203 |
| 5,742,905 A | * | 4/1998 | Pepe et al. .................. 455/461 |
| 5,855,015 A | * | 12/1998 | Shoham ...................... 707/501 |

FOREIGN PATENT DOCUMENTS

| | | | |
|---|---|---|---|
| | 5,321,737 A | 6/1994 | Patsiokas |
| EP | 0605311 A1 | 7/1994 | |
| FR | 2700087 | 7/1994 | |
| JP | 62-101156 | 5/1987 | |
| JP | 63-182924 | 7/1988 | |
| JP | 63-256044 | 10/1988 | |
| JP | 6-501351 | 2/1994 | |
| JP | 6-161918 | 6/1994 | |
| JP | 6-261121 | 9/1994 | |
| JP | 6-319167 | 11/1994 | |
| JP | 8-6875 | 1/1996 | |
| JP | 8-51658 | 2/1996 | |
| JP | 8-125746 | 5/1996 | |
| NO | 934858 | 12/1993 | |
| WO | WO 92/03007 | 2/1992 | |

OTHER PUBLICATIONS

Brown et al., A Network Architecture for Mobile Computing, Univ. of South Carolina, pp. 1–18, Sep. 7, 1995.*

Bakre et al, I–TCP: Indirect TCP for Mobile Hosts, Rutgers University, pp. 1–18, Oct. 1994.*

* cited by examiner

\* HLEN: Header Length  \*\* CODE BIT

INFORMATION PROVIDING APPARATUS AND PORTABLE COMMUNICATION TERMINAL

TECHNICAL FIELD

The present invention relates to an information providing apparatus which provides information by the use of a radio communication network and a portable communication terminal which receives the information.

BACKGROUND ART

Referring to FIG. 20, a conventional information providing apparatus and portable communication terminal device using a radio communication network will be described.

A communication terminal 122 is connected to a radio communication network 120 via a transmission/reception antenna 122A of the communication terminal 122 and a transmission/reception antenna 120A of the radio communication network 120. The radio communication network 120 is the communication network managed by a radio communication service provider. The radio communication network is connected to a public communication network 121 such as a telephone line network, a packet network, an ISDN (Integrated Services Digital Network), a private line, and so on.

A server 123 is a computer, connected to the public communication network 121 of a computer communication company. The server 123 is the server which carries out a communication processing and a data transfer processing in accordance with an access from a user using the communication terminal 122. The server is provided with a data base 123DB in which service information is stored.

The communication terminal 122 is constructed so that it may be carried and moved with the user. The communication terminal is a combination of a portable computer 122C and a communication-processible portable telephone 122B. A particular communication protocol for a data transfer is used between the portable telephone 122B of the communication terminal 122 and the radio communication network 120. On one hand, the data is not specifically converted between the server 123 and the portable computer 122C of the communication terminal 122. Furthermore, for the access from the portable computer 122C of the communication terminal 122 to the server 123, a software for a computer communication only referred generally to as a "terminal soft (Terminal Application Software)" or a "viewer (Viewer)" is used.

When the communication service provider which provides the radio communication network 120 is also a manager of the server 123, in some cases, the server 123 and the data base 123DB are directly connected to the radio communication network 120. In this case, the communication terminal 122 is a single portable telephone. The communication service provider provides such services as a voice mail service for distributing digitized voice data, an incoming call transfer service for transferring the incoming call to other previously-registered telephone number and the like by the use of the server 123. The user having the portable communication terminal 122 subscribes to the communication service provider which manages the radio communication network 120, so that the services can be provided for the user.

In the conventional information providing apparatus described above, since the portable communication terminal is the combination of the portable computer and the portable telephone, it is inconvenient to carry the portable communication terminal. Furthermore, in case of communicating with the server, it is necessary to operate both of the portable computer and the portable telephone, respectively. In addition, a number of keys are disposed on the portable computer, and the keys are constructed so that they may be used in general-purpose for operating the portable computer. Accordingly, a key assignment of a communication operation is not displayed. Therefore, a user's operability becomes worse.

Furthermore, in the conventional information providing apparatus described above, the portable communication terminal is the combination of the portable computer and the portable telephone. Accordingly, the software for the computer communication only must be installed into the portable computer. Otherwise, it is not possible to communicate with the server and to obtain the information from the data base.

Furthermore, in the conventional information providing apparatus described above, when the portable communication terminal is a single portable telephone, it is not provided with a processing function for communicating with an external information providing server and for obtaining the information from the data base. Accordingly, it is not possible to access to an information providing service company and the information providing server on an Internet.

Furthermore, in the conventional information providing apparatus described above, when the portable communication terminal is a single portable telephone, it is not provided with a decoding function for decoding external image information and a processing function for processing the image information. Accordingly, it is not possible to obtain and display the external image information.

From such a viewpoint, it is an object of the present invention to provide an information providing apparatus comprising a portable communication terminal connectable to a radio communication network and a portable communication terminal wherein the portable communication terminal is a small-sized resulting in having an excellent portability and a good operability, the multimedia information can be obtained from the server connected to the radio communication network or the external information communication network, the obtained multimedia information can be outputted to a human-machine interface means, the portable communication terminal can access to the server connected to the external information communication network so as to obtain the multimedia information from the server without installing the terminal application software or the like, the viewer and the like into the portable communication terminal, the obtained multimedia information is processed or converted in accordance with an output capability of the human-machine interface means so that the information can be outputted to the human-machine interface means.

DISCLOSURE OF THE INVENTION

In order to achieve the above object, according to one aspect of the present invention, there is provided an information providing apparatus comprises a portable communication terminal having a telephone communication means which accesses to a server or a data base connected to a portable telephone system network so as to receive multimedia information from the server or the data base and a human-machine interface means for which the multimedia information is provided from the telephone communication means, and a portable communication terminal server having a data base in which the multimedia information is stored, an external communication processing means which accesses to the server connected to an external information communication network and receives the multimedia information from the server, a data processing means for processing or converting the multimedia information from the external communication processing means, and a transfer means for transferring the multimedia information from the external communication processing means or the data processing means to the portable communication terminal via the portable telephone system network.

In order to achieve the above object, according to another aspect of the present invention, there is provided a portable communication terminal, wherein a telephone communication means accesses to a server or a data base connected to a portable telephone system network so as to receive the multimedia information from the server or data base, so that the multimedia information is provided for the human-machine interface. In the portable communication terminal server, the external communication processing means accesses to the server connected to the external information communication network so as to receive the multimedia information from the server. The data processing means processes or converts the received multimedia information. The transfer means transfers the multimedia information from the external communication processing means or the data processing means to the portable communication terminal via the portable telephone system network.

BEST MODE FOR CARRYING OUT OF THE INVENTION

Hereinafter, embodiments of the present invention will be described with reference to the accompanying drawings.

Figure 1:
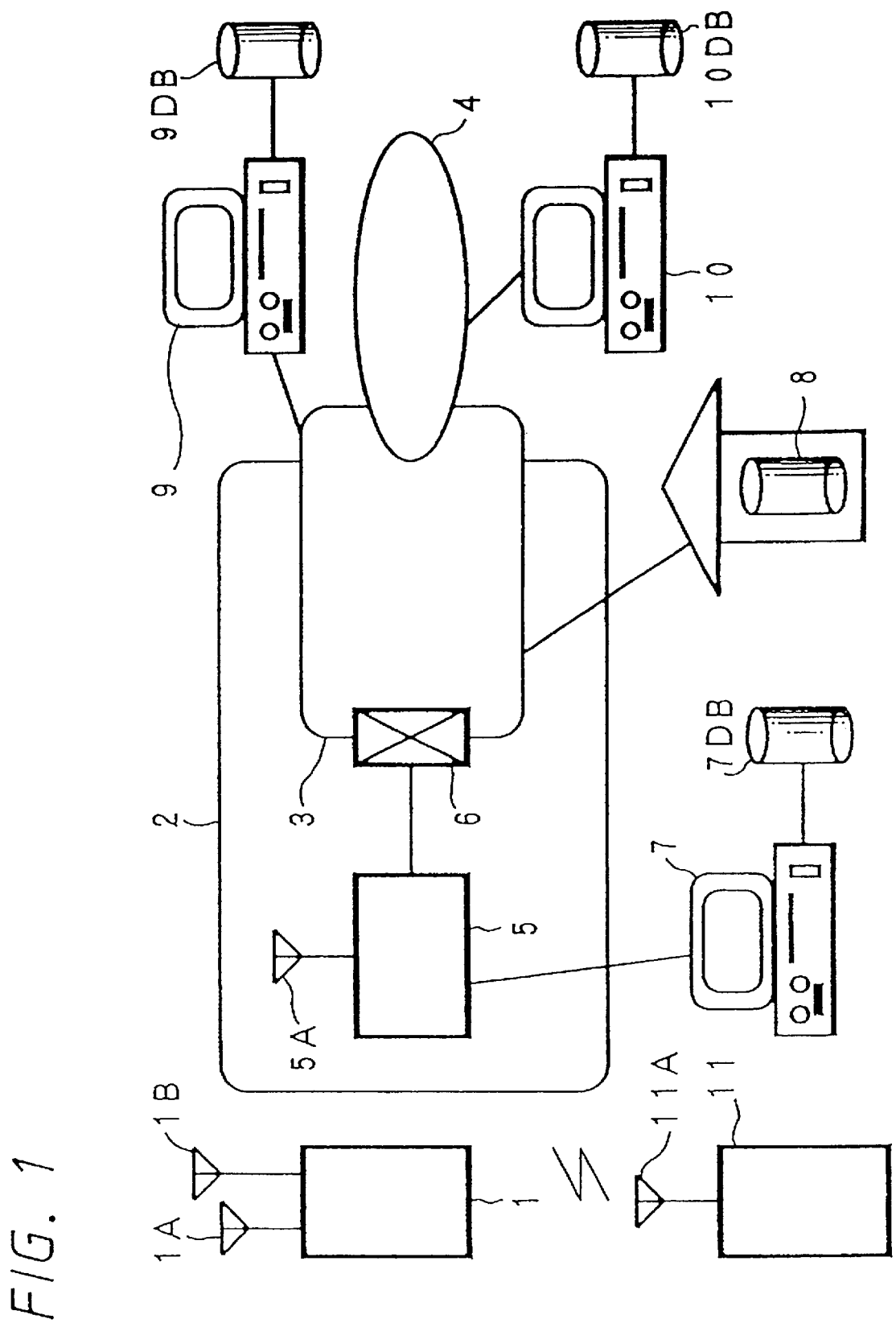
FIG. 1 is a block diagram showing an information providing apparatus according to an embodiment of the present invention.

In the first place, referring to FIG. 1, a whole construction of an information providing apparatus (system) will be described. A radio communication network 2 is a communication network using a radio employed in a mobile communication and the like. In the present embodiment, a personal handy phone system network (PHS Network :Personal Handy Phone System Network) is used as one example of the radio communication network. A public communication network 3 is composed of a telephone line network, a packet network, an ISDN, a personal line and the like. The public communication network 3 is connected to the radio communication network via an exchange 6. An external information communication network, an Internet 4 is a line used mainly for an inter-computer communication connected to the public communication network. The Internet is connected with a plurality of servers and client terminals. A base station 5 is one of a number of base stations located in the PHS network 2. The base station has a transmission/reception antenna 5A for connecting to a portable communication terminal 1. The exchange 6 is one of a number of exchanges located in the PHS network 2. The exchange connects the PHS network 2 to the public communication network 3, and it manages a plurality of base stations including the base station 5.

The PHS is one of mobile communication systems carried out in Japan, in which, radio base stations are disposed at intervals of hundreds of meters. Position information is periodically exchanged between a telephone terminal device and the nearest base station among a plurality of base stations. The telephone terminal device communicates with other telephone terminal device via this base station. Furthermore, in the PHS, a TDD (Time Division Duplex) system is used so that a voice signal is compressed as it is temporally divided, whereby the signal is transmitted and received by the use of one carrier frequency. Moreover, a TDMA (Time Division Multiple Access) system is used so that four channels are temporally divided at one carrier frequency, whereby a multiple communication is carried out. A frequency band used for the PHS communication is a 1.9 GHz band. Furthermore, a digital data communication can be performed at a transmission rate of 32 kbits/sec per channel. A plurality of channels are used in one terminal, so that data can be also transmitted up to a maximum of 128 kbits/sec [(32 kbits/sec)×4 (channels)].

The portable communication terminal 1 is a terminal equipment operated by a user who subscribes to the PHS mentioned above. The portable communication terminal is provided with a telephone transmission/reception antenna 1A for connecting to the nearest PHS base station 5 by means of a radio wave and a broadcast reception antenna 1B for receiving a broadcasted wave from a broadcasting station 11.

A portable communication terminal server 7 (henceforth, referred to as a PHS server) is connected to the base station 5 in the PHS network 2, and is provided with a data base 7DB which stores multimedia information associated with an area where the base station 5 is located. The PHS server 7 and the data base 7DB can be connected to the exchange 6. In this case, the data base 7DB stores the multimedia information associated with the area where a plurality of base stations managed by the exchange 6 are located.

A server 9 is a server which is connected to the public communication network 3 and operated by an information providing company. Normally, the user accesses to the server 9 from the terminal equipment (not shown) connected to the public communication network 3. The server 9 is provided with a data base 9DB for storing the multimedia information.

A server 10 is one of a plurality of servers which are connected to the external information communication network, that is, the Internet 4 so as to communicate with the terminal equipment connected to the public communication network 3 or the Internet 4 by the use of an HTTP (Hypertext Transfer Protocol). The above server is provided with a data base 10DB for storing the multimedia information. Furthermore, a personal data base 8 is a data base which is connected to the public communication network 3 and stores personal information of a user who has the communication terminal 1.

Note that the multimedia information means computer-processible information including image information such as an animated picture, a still picture aside or the like from, for example, a text (character) information. The multimedia information indicates the information composed of an arbitrary combination of the data such as the image, sound, character and so on.

Furthermore, the HTTP is a protocol used between the server providing the information and the client terminal requesting the information in a so-called WWW (World-Wide Web) system which makes it possible to browse, in a hypertext form, the information on a plurality of servers connected to the Internet. After the client terminal establishes a communication connection to the server, the client terminal transmits an information request command to the server. After the server transmits the corresponding data in response to the information request command to the client, the server performs a process for disconnecting from the client.

The broadcasting station 11 is, for example, an FM radio broadcasting station. The broadcasting station multiplexes character data information onto a voice signal, and broadcasts the multiplexed signal via a transmission antenna 11A.

The broadcast from the broadcasting station 11 is received by the communication terminal 1 and a broadcast receiving apparatus (for example, a radio receiver). The embodiment will be described, as one example of the broadcasting station 11, by the use of a so-called mini FM radio broadcasting station which broadcasts by means of the radio wave having a relatively weak power in order to broadcast area information within a particular limited area.

The broadcasting station 11 is not limited to the mini FM radio broadcasting station. The broadcasting station may be a broadcasting station which multiplexes the data signal such as the character and the image onto the voice signal or the image signal so as to carry out the broadcast thereof. For example, there are the broadcasting station which carries out an FM radio broadcast which multiplexes the character information onto the voice signal so as to carry out the broadcast, a character broadcast which multiplexes the character/image information onto the video signal so as to carry out the broadcast, a broadcast in which address information of computer network (for example, a URL (Uniform Resource Locator) information and the like used for the WWW) is multiplexed onto the image signal, or the like.

Figure 2:
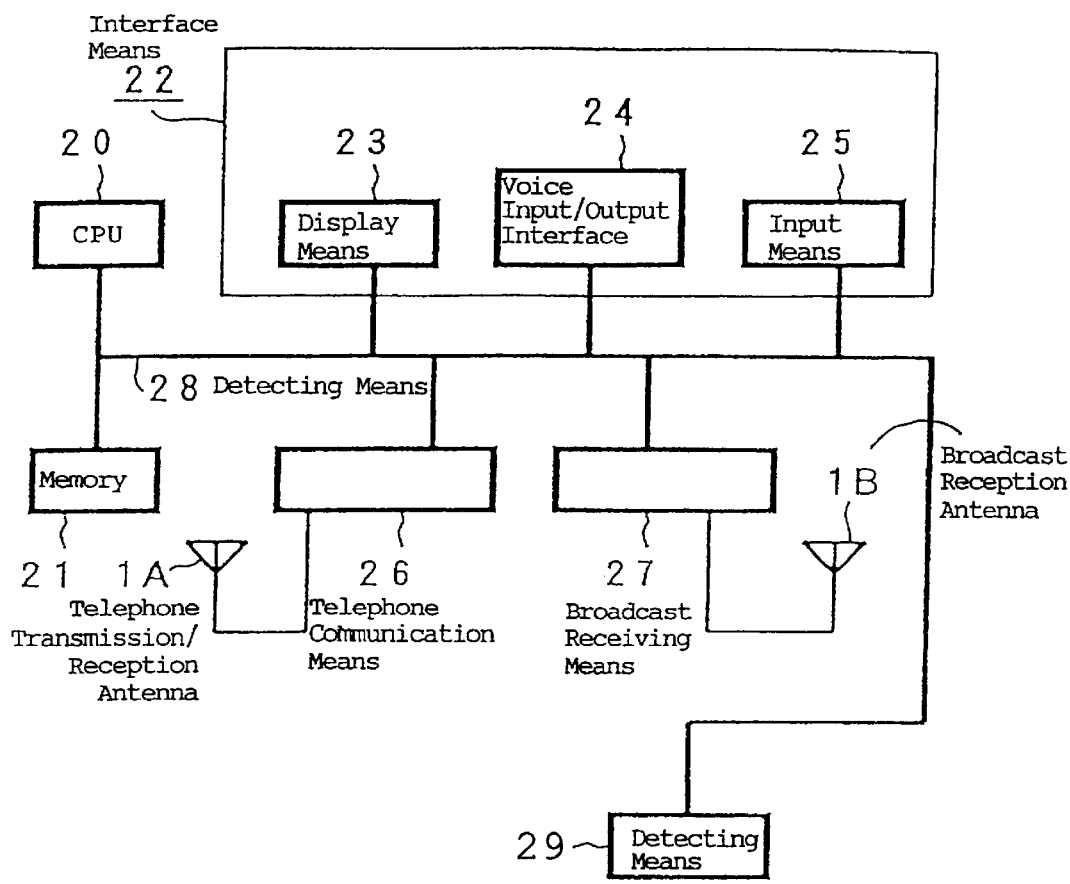
FIG. 2 is a block diagram showing a construction example of a portable communication terminal of the information providing apparatus according to the embodiment.

Next, referring to FIG. 2, a construction example of the communication terminal 1 will be described. A CPU (Central Processing Unit) 20 performs a telephone function processing for telephoning and answering the telephone and a processing for transmitting/receiving the multimedia information. The CPU 20 is connected, via a bus 28 (including a data bus, a control bus, an address bus and the like), to a RAM (Random Access Memory) for temporarily storing processed data, a memory 21 comprising a ROM (Read only Memory) in which an operation program and data are stored, a human-machine interface means 22 for interfacing a the user, a telephone communication means 26 having a high frequency circuit for communicating with the PHS network 2, a modulation/demodulation circuit and a TDMA/TDD processing circuit, a broadcast receiving means 27 for receiving and processing the broadcast from the broadcasting station 11, and a detecting means 29 for detecting a broadcast instructing signal or an on-air signal. The human-machine interface means 22 is provided with a display means 23 comprising a liquid crystal display device and a display circuit, a voice input/output interface 24 having a voice processing portion including a microphone, a speaker and a voice codec, and an input unit 25 disposed on the liquid crystal display of a liquid crystal display device comprising a touch sensor and an input circuit. The telephone communication means 26 is connected to the telephone transmission/reception antenna 1A. The broadcast receiving means 27 is connected to the broadcast reception antenna 1B which receives the broadcast from the broadcasting station 11.

In the present embodiment, although a touch panel disposed on the display means 23 is used as the input unit 25, the input portion can be so constructed that a key pad or the like is used aside from the display means 23.

Next, referring to FIG. 3, the construction example of the PHS server 7 connected to the base station 5 in the PHS network 2 will be described. A CPU 30 is connected, via a bus 36 (including a data bus, a control bus, an address bus and the like), to a RAM (Random Access Memory) for temporarily storing the processed data, a memory 31 comprising a ROM (Read only Memory) in which the operation program and the data are stored, a transfer means 32 for transferring, to the communication terminal 1, the multimedia information associated with the particular area stored in a data base 35 (corresponding to the data base 7DB in FIG.

1) comprising an external storage device, a data processing means 33 for processing the data as to the multimedia information in various forms having the character, image, voice information and the like transmitted from the server 9 or 10 connected to the external information communication network (the public communication network 3 or the Internet 4), an external communication processing means 34 for communicating with the server 9 or 10, and the like.

Next, the multimedia information stored in the data base 35 (7DB) of the PHS server 7 will be described. When the server 7 is accessed from the communication terminal 1, the multimedia information to be transferred from the data base 7DB to the communication terminal 1 is the multimedia information such as a headline list, the text without a picture, a voice, a still picture, a time-lapse picture and the like in consideration of a small-scale output capability of the human-machine interface means 22 of the communication terminal 1 in FIG. 2. Furthermore, when the server 7 is accessed from the communication terminal 1 connected to the external information communication networks 2, 3 and the like, in case of the small-scale output capability of the human-machine interface means 22 of the communication terminal 1, the multimedia information to be transferred from the data base 7DB to the communication terminal 1 is same as the multimedia information to be transferred to the communication terminal 1 described above. On one hand, in case of a large-scale output capability of the human-machine interface means 22 of the communication terminal 1, the multimedia information such as the headline, the text without the picture, the text including the picture, the voice, the still picture, the time-lapse picture, the animated picture and the like is transferred.

As the multimedia information stored in the data base 35 (7DB), concretely, a movie information, a restaurant information, a bar information, a parking information and an event information associated with the area where the base station 5 (or the exchange 6) exists are stored as an explanatory note by means of the character and map data by means of the image.

Figure 4:
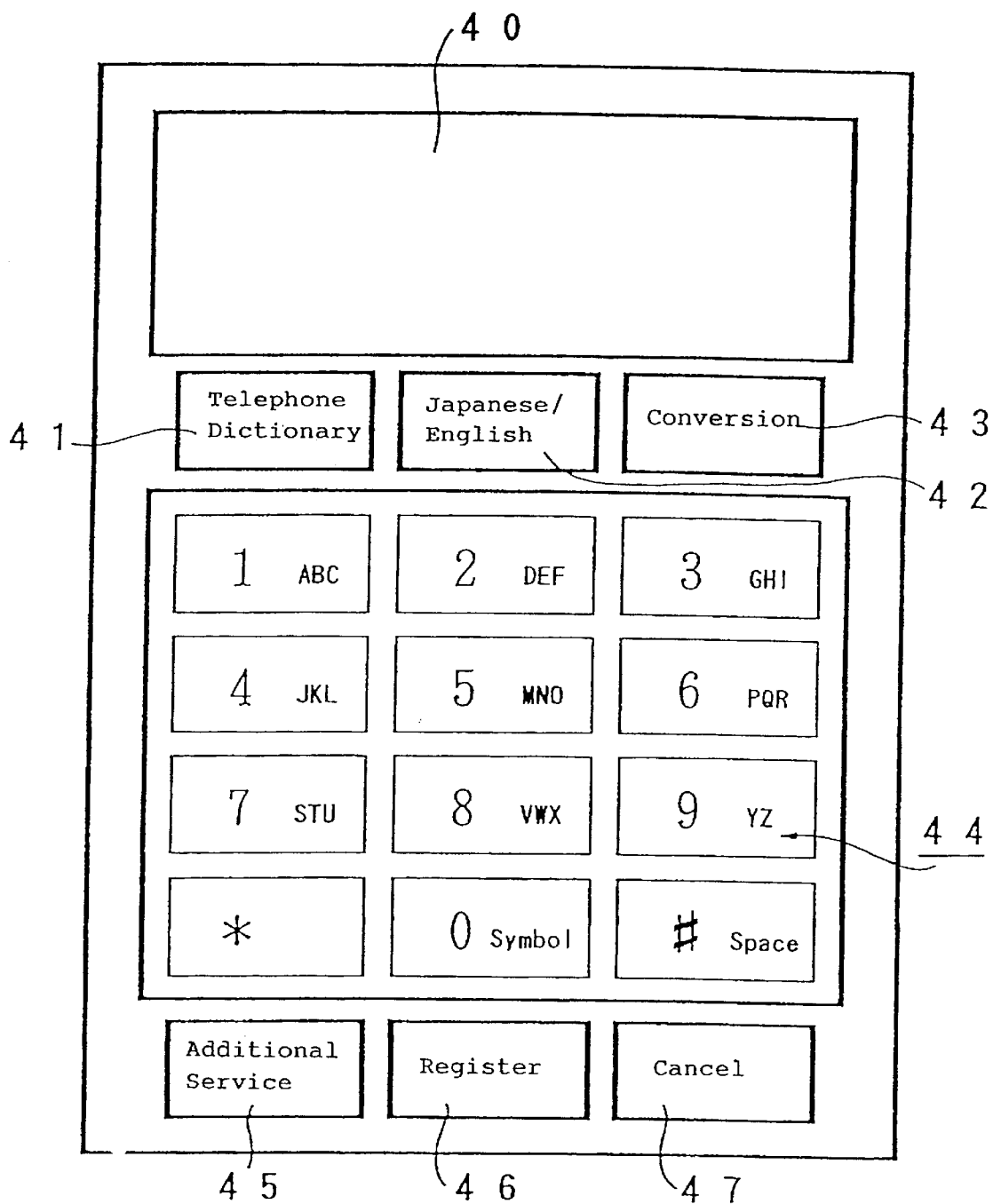
FIG. 4 is a schematic illustration showing a display of the portable communication terminal of the information providing apparatus according to the embodiment.
Figure 5:
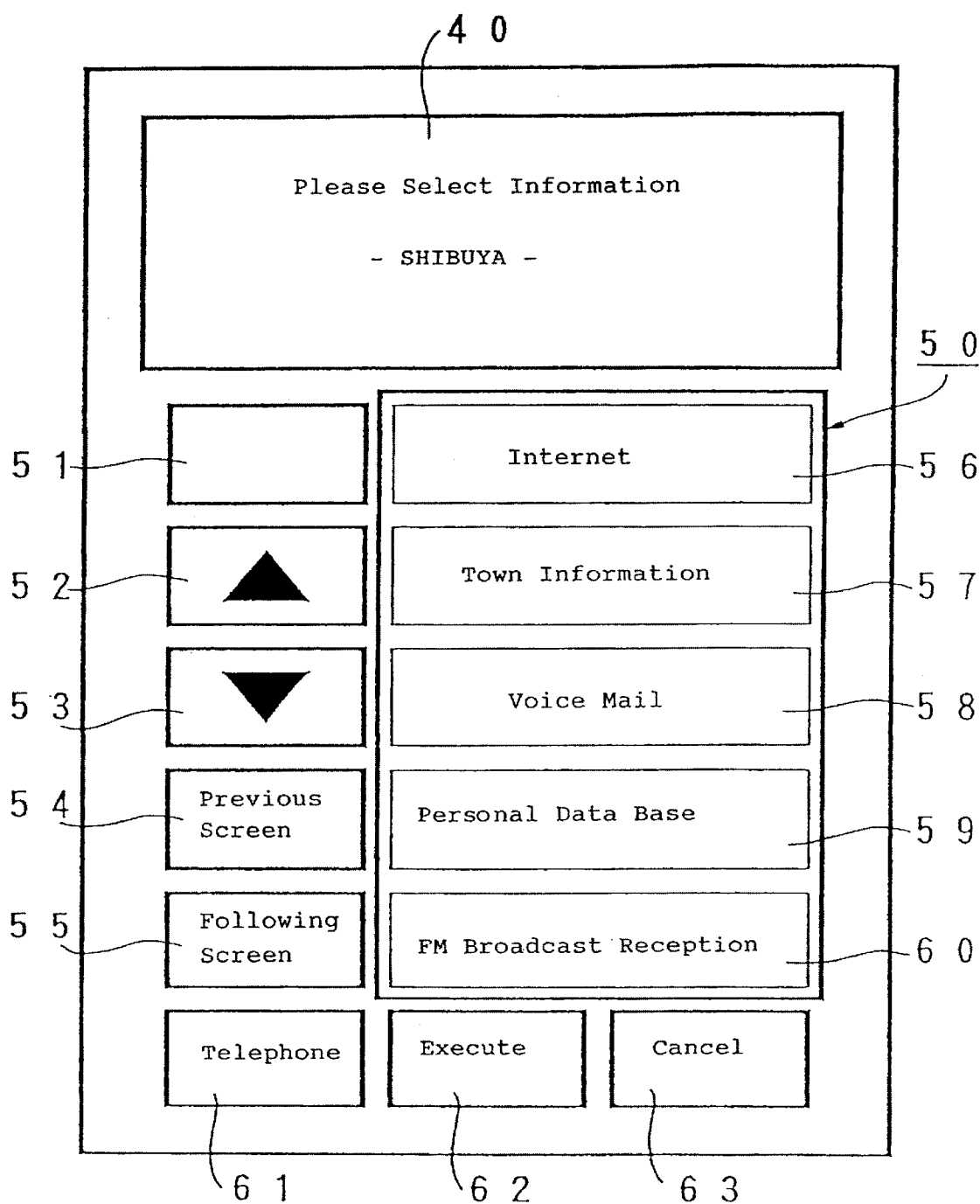
FIG. 5 is a schematic illustration showing the display of the portable communication terminal of the information providing apparatus according to the embodiment.
Figure 6:
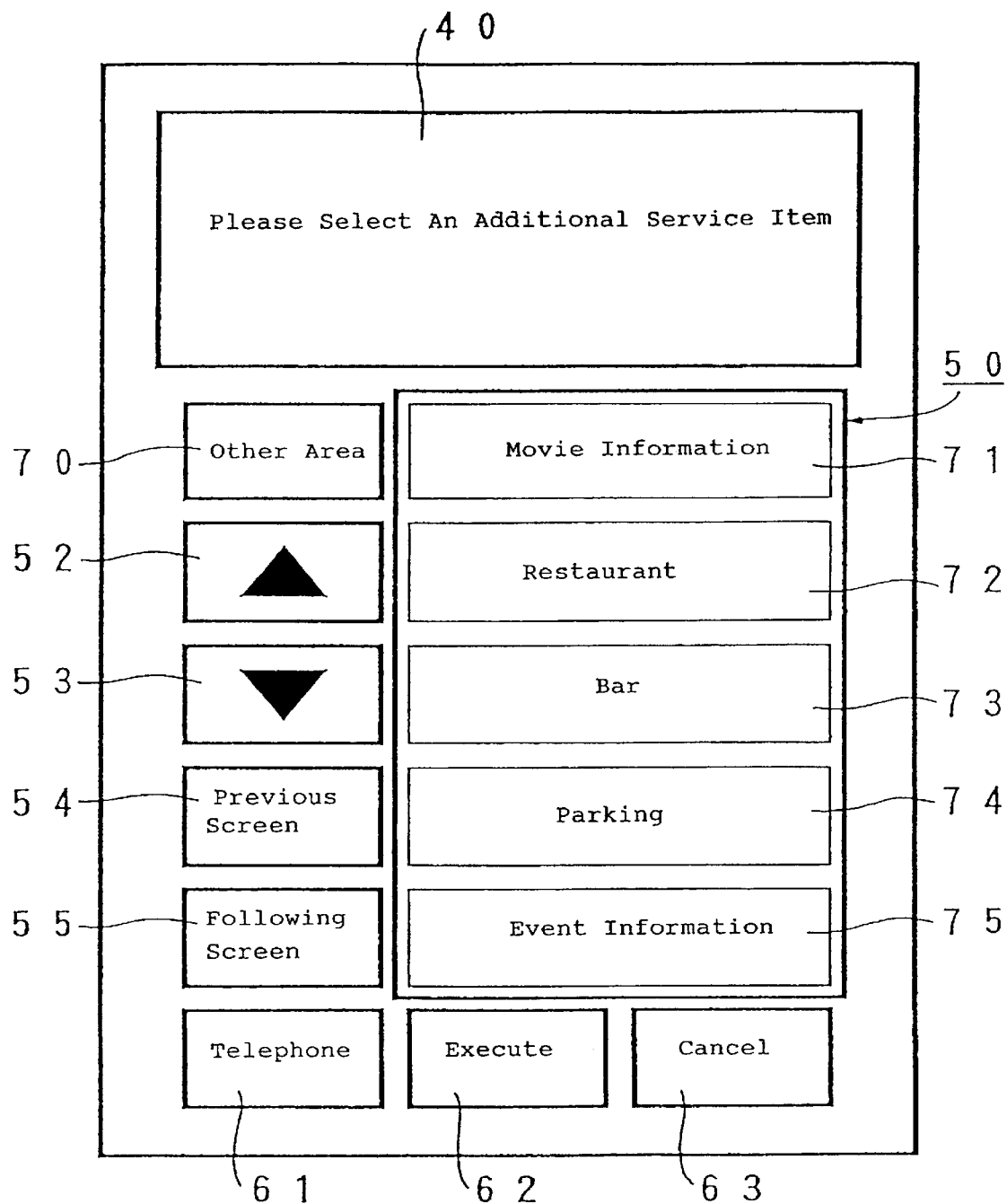
FIG. 6 is a schematic illustration showing the display of the portable communication terminal of the information providing apparatus according to the embodiment.

Next, referring to FIGS. 4 to 6, a display state in the display means 23 of the communication terminal 1 and an input operation by means of the input unit 25 thereof will be described. In FIGS. 4 to 6, a power switch (not shown) of the communication terminal 1 is already turned ON.

In the first place, an initial display screen and an operation portion shown in FIG. 4 will be described. An information display portion 40 is a display portion in which a sentence and image are displayed, and it is not changed even in FIGS. 5 and 6. When a telephone dictionary button 41 is pressed, a telephone number of a person's name, a company's name and the like which is already registered is displayed in the information display portion 40. At this time, a telephone number of a new person's name or company's name can be also inputted. A Japanese/English switching button 42 is an operation portion for switching a kind of an inputted character when the character is inputted for making the telephone dictionary and the like. In the embodiment, the Japanese/English switching button is constructed so that Japanese and English characters can be switched. When a Japanese input mode is selected by the Japanese/English switching button 42, a conversion button 43 is an operation portion for converting a Kana character displayed in the information display portion 40 into a Kanji character. A numerical value/character input button 44 is the operation portion of a ten key and a function key (an asterisk key and a sharp key) for inputting the telephone number upon a telephonecall. The inputted telephone number is displayed in the information display portion 40. The numerical value/character input button 44 serves also as an operation portion for inputting the character when the character is required to be inputted, for example, when the telephone dictionary is edited or the like. An additional service button 45 is an operation portion connected to the PHS network 2 for obtaining multimedia information from the PHS server 7 or the servers 9 and 10. A register button 46 is an operation portion for determining the inputted numerical value/ character. Upon telephoning, the telephone number inputted by the numerical value/character input button 44 is displayed in the information display portion 40. After the user confirms the displayed telephone number, the register button 46 is operated so that the CPU 20 connects to the PHS network 2 and calls the specified telephone number. Furthermore, when the telephone dictionary button 41 is operated so that a telephone dictionary mode is selected, the register button 46 is operated so that the person's name, the company's name, the telephone number and the like inputted by the user are confirmed. The CPU 20 carries out a register processing or a telephone number display processing to the information display portion 40. A cancel button 47 is an operation portion for canceling the input of the operation button so as to return the information display portion 40 to an initial display state.

Under a state where a character is required to be inputted, the numerical value/character input button 44 is operated, so that the character in the mode selected by the Japanese/ English switching button 42 can be inputted. As shown in FIG. 4, alphabets "A" to "Z" and symbols are assigned to the respective numerical value/character input button 44. For example, the alphabets A, B, C are assigned to a button "1" of the numerical value/character input button 44. The button "1" is pressed in a character input state, so that the character "A" can be displayed in the information display portion 40. Thereafter, furthermore, the button "1" is successively pressed, so that the character "A" is replaced and the characters "B" and "C" are sequentially displayed. When the character "C" is displayed, the button "1" is further pressed, so that the character "A" is again displayed. When the character "A", "B" or "C" is displayed, the register button 46 is operated so that the inputted character is determined. The remaining numerical value/character input button 44 is operated in the same way, so that the character assigned to respective button can be inputted.

When the additional service button 45 shown in FIG. 4 is operated, in accordance with a communication processing between the communication terminal 1 and the PHS server 7 described below, the display screen of the display means 23 is changed to a next display screen shown in FIG. 5. The display screen and operation portion shown in FIG. 5 will be described.

In the information display portion 40 is displayed, for example, "Please select information.—Shibuya—" so as to urge the user to select a desired information. In an information selecting portion 50 are displayed, for example, an Internet selection button 56 for obtaining the multimedia information from the data base 10DB of the server 10 connected to the Internet 4, a town information selection button 57 for obtaining the multimedia information as to the particular area from the data base 7DB of the server 7 connected to the base station 5 (or the exchange 6), a voice mail selection button 58 which converts the voice signal inputted from the voice input/output interface 24 of the communication terminal 1 into a digital signal in order to distribute the digital signal as an electronic-mail to a terminal equipment connected to other communication terminal or a external information communication network, a personal data base selection button 59 for obtaining a personal information (for example, a schedule) from a personal data base connected to a public data network 8, and an FM broadcast reception selection button 60 for receiving the FM broadcast from the broadcasting station 11. An up button 52 and a down button 53 are allocated with a function so as to switch the display of the selection button displayed in the information selecting portion 50, and the they are operated when other selection button (for example, a selection button for accessing to the data base 9DB of the server 9 connected to the public communication network 3) is selected in accordance with a user-selected operation button record stored in the memory 21 of the communication terminal 1, a previous screen selection button 54 and a following screen selection button 55 are operated so as to switch the display of the information selecting portion 50 in forward and backward direction of a history. A telephone button 61 is an operation portion for returning to a telephone function display which is the initial display screen shown in FIG. 4. When an execute button 62 is pressed after any one of the operation buttons 56 to 60 is selected, a mode selected by one of the operation buttons 56 to 60 is determined by the excute button 62. If a cancel button 63 is pressed after any one of the operation buttons 56 to 60 is selected, a selected operation thereby is canceled by the cancel button 63.

When the town information selection button 57 is operated, the display screen of the display means 23 is changed to a display screen shown in FIG. 6. The display screen and operation portion shown in FIG. 6 will be described.

In the information display portion 40 is displayed, for example, "Please select an additional service item". In the information selecting portion 50 are displayed a movie information selection button 71, a restaurant information selection button 72, a bar information selection button 73, a parking information selection button 74 and an event information selection button 75. An other area selection button 70 is an operation portion for selecting the area information as to other area except the area where the user is currently positioned (for example, other area information as to other area except Shibuya). The PHS server in other area is accessed by the other area selection button, so that the multimedia information as to other area can be obtained. The up button 52 and the down button 53 are allocated with a function so as to switch the display of the selection button displayed in the information selecting portion 50, and they are sperated when other selection button (for example, a selection button of a theater information, a live house information and the like) is selected. In accordance with the user-selected operation button history stored in the memory 21 of the communication terminal 1, the previous screen selection button 54 and the following screen selection button 55 are operated so as to switch the display of the information selecting portion 50 in forward and backward direction of the history. The telephone button 61 is the operation portion for returning to the telephone function display which is, the initial display screen shown in FIG. 4. When the execute button 62 is pressed after any one of the operation buttons 71 to 75 is selected, the mode selected by one of the operation buttons 71 to 75 is determined by the excute button 62. If the cancel button 63 is pressed after any one of the operation buttons 71 to 75 is selected, the selected operation thereby is canceled by the cancel button 63.

The selection button displayed in the information selecting portion 50 is received from the PHS server 7 or is read out from the memory 21 of the communication terminal 1 and then displayed.

Next, a data processing method by means of the data processing means 33 of the PHS server 7 will be described. The multimedia information stored in the data base 9DB of the server 9 and the data base 10DB of the server 10 is formed basically in assumption that it is accessed from the terminal equipment, connected to the public data network 3 and the Internet 4, comprising a display device having a high resolution. In order to make it possible to display such multimedia information in the portable communication terminal via a radio communication line, a memory having a considerably large capacity and a display device having the high resolution are required. Therefore, it is difficult to reduce the size of the portable communication terminal. Accordingly, in order that the portable communication terminal device comprising a memory having a small capacity and a display device having a low resolution can display the multimedia information, the multimedia information is processed or converted into information suitable for a display capability of the communication terminal 1 by means of the data processing means 33 of the PHS server 7.

A method that the PHS server 7 specifies the display capability of the communication terminal 1 is as follows. For example, a machine type ID for each kind of terminals is previously stored in the memory 21. When the communication connection is established between the communication terminal 1 and the PHS server 7, the machine type ID is transmitted from the communication terminal 1 to the PHS server 7, so that the PHS server 7 recognizes the display capability of the communication terminal 1.

Furthermore, an individual ID and the machine type ID assigned to each communication terminal are previously registered in a server (not shown) which manages all over the PHS network 2. When the communication is connected, the individual ID is transmitted to the managing server. The corresponding machine type ID to the individual ID received by the managing server is retrieved, and then is transmitted to the PHS server 7 connected with the communication terminal 1.

Hereinafter, a data processing and a conversion processing will be described with reference to FIGS. 7 to 11.

Figure 7:
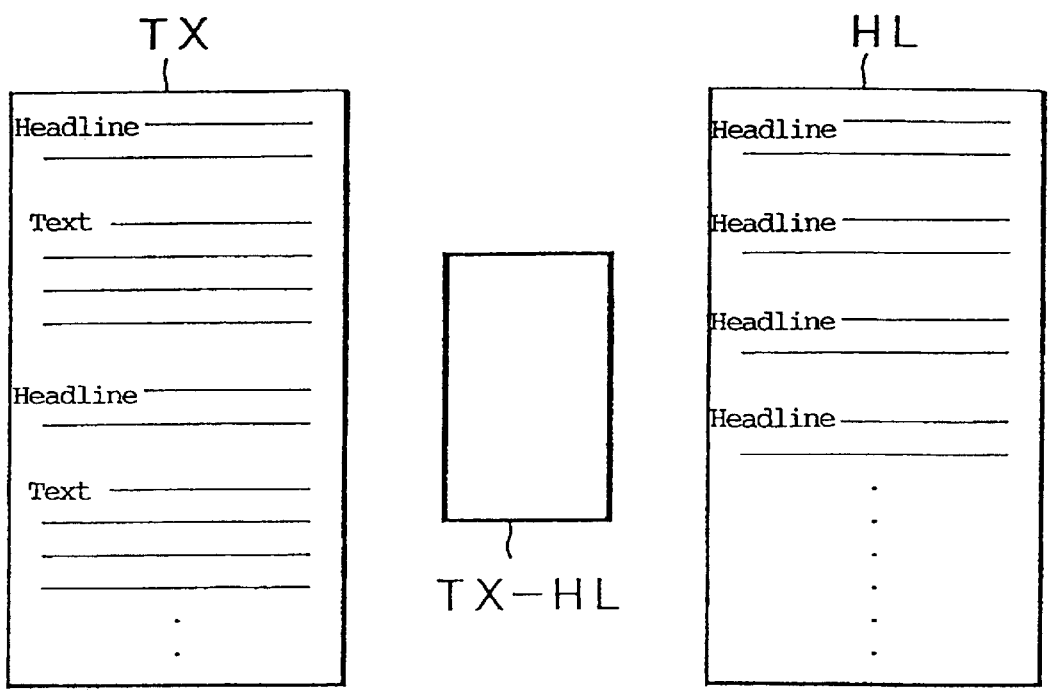
FIG. 7 is a schematic illustration showing a data processing method of a data processing means.

In the first place, in a data processing method shown in FIG. 7, there is carried out such a processing that a headline extracting means TX-HL extracts a plurality of headlines HL alone from one or a plurality of headlines and a text TX comprising the corresponding text to each headline from the server 9 or 10 on the external information communication network.

Figure 8:
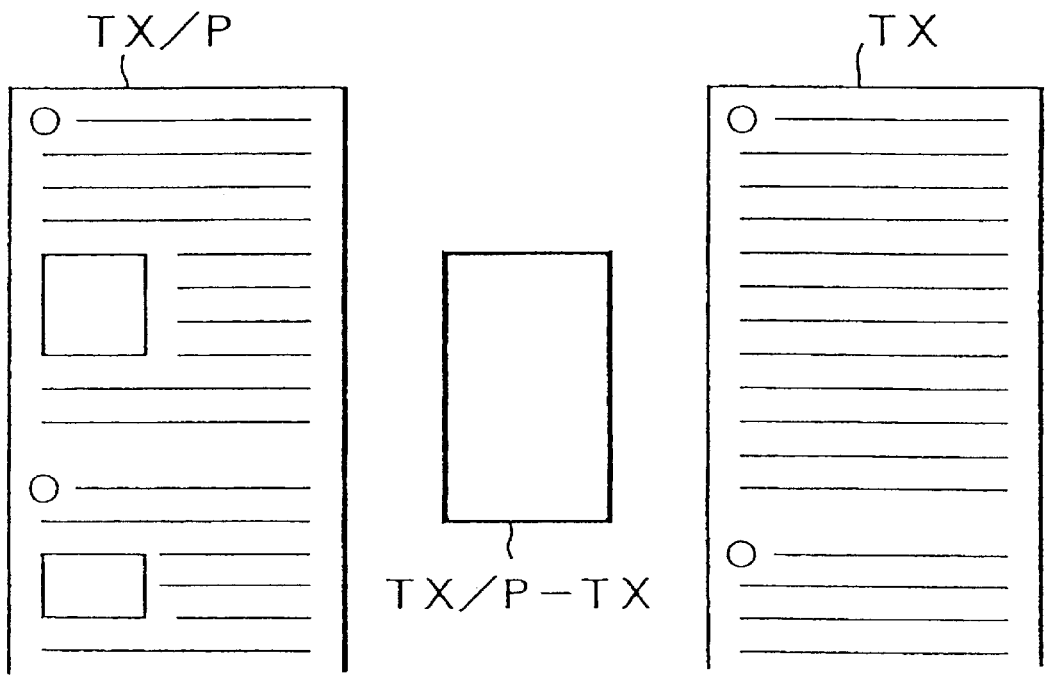
FIG. 8 is a schematic illustration showing the data processing method of the data processing means.

In a data processing method shown in FIG. 8, there is carried out such a processing that a text extracting means TX/P-TX extracts a text without picture (comprising a headline and a text corresponding to each headline) TX from a text including the picture (comprising a headline, a text corresponding to each headline and a picture included in one or all part of the text) TX/P from the server 9 or 10 on the external information communication network.

Figure 9:
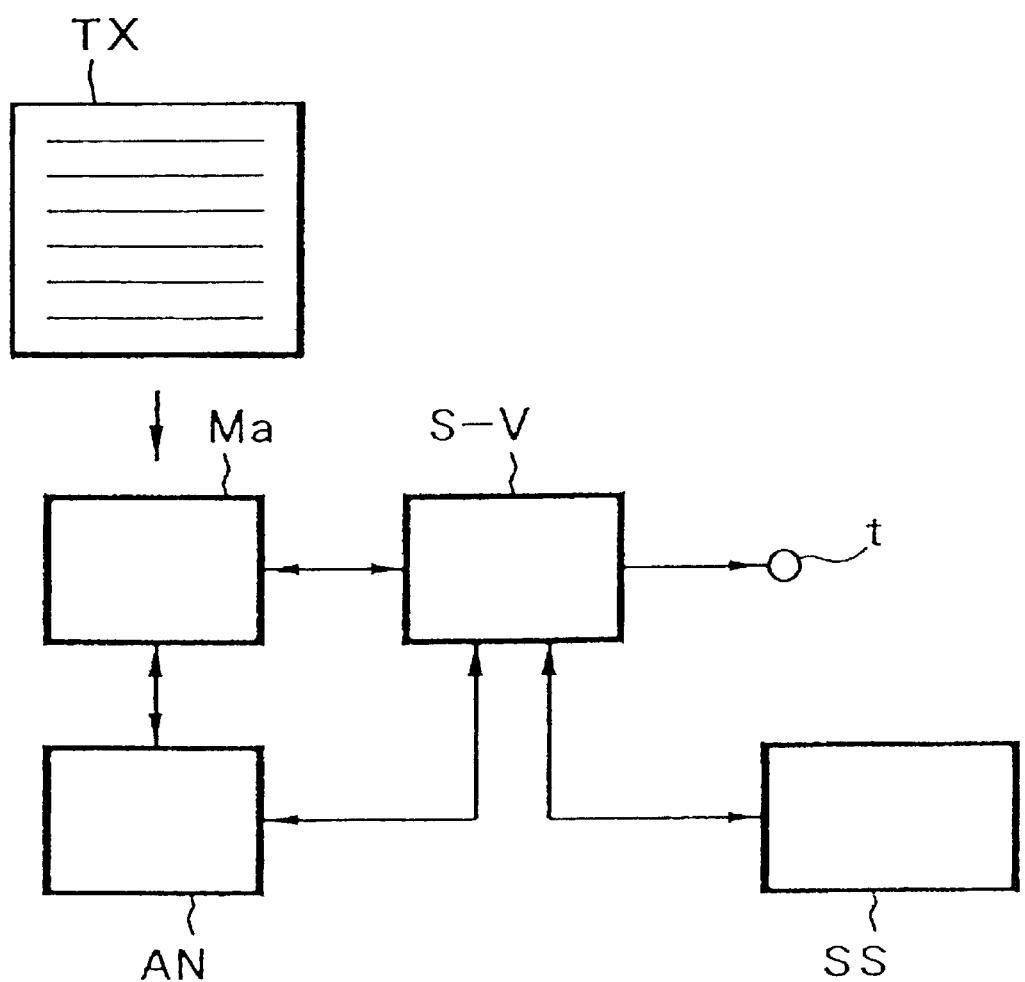
FIG. 9 is a schematic illustration showing the data processing method of the data processing means.

In a data processing method shown in FIG. 9, there is carried out such a processing that once a memory Ma stores a text TX comprising or a plurality of one headlines and a corresponding text to each headline from the server 9 or 10 on the external information communication network. A sentence structure of the text TX is analyzed by means of a sentence structure analysis means AN. A voice synthesizing means SS is used so that the text is converted into a voice signal by means of a sentence-voice conversion means S-V, resulting in outputting the voice signal to an output terminal t. The output terminal t is connected with an amplifier, so that the voice signal is outputted to the speaker of the voice input/output interface 24.

Figure 10:
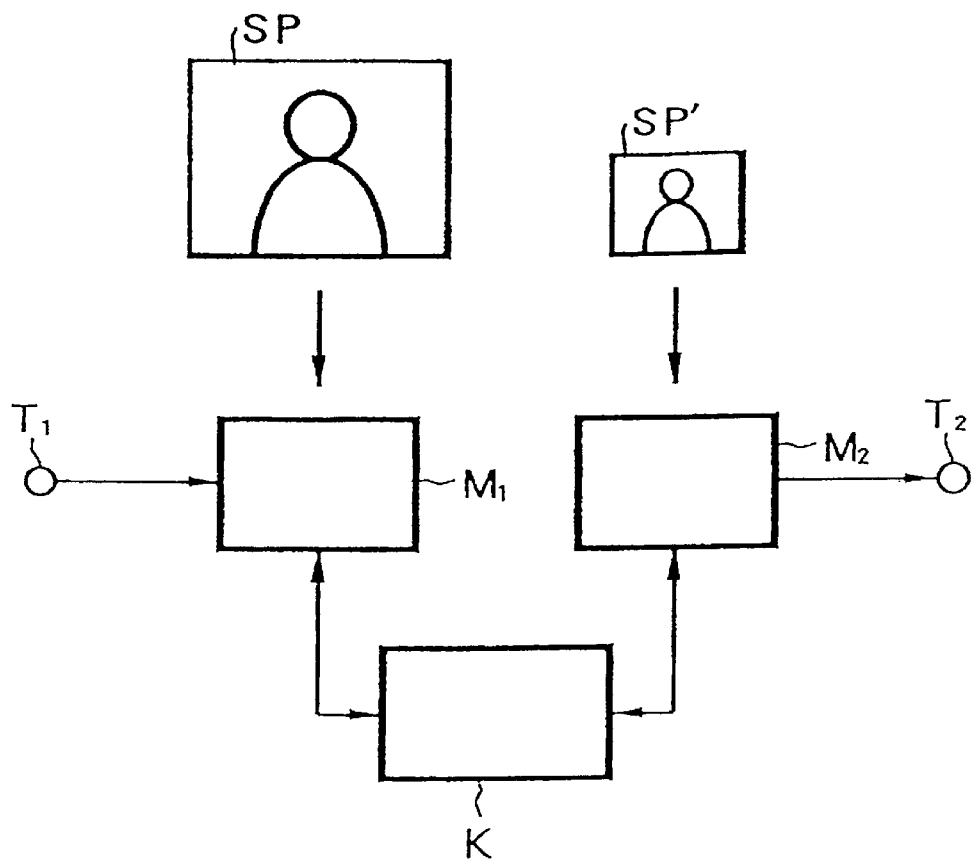
FIG. 10 is a schematic illustration showing the data processing method of the data processing means.

In a data processing method shown in FIG. 10, an image signal of a still picture SP from the server 9 or 10 on the external information communication network is written from an input terminal $T_1$ to a memory $M_1$. The image signal of the still picture SP stored in the memory $M_1$ is horizontally and vertically thinned out by means of a thinning processing means K. Then, the image signal is written into a memory $M_2$, and the written signal is read. The image signal of a still picture SP' thinned out is outputted from an output terminal $T_2$.

Figure 11:
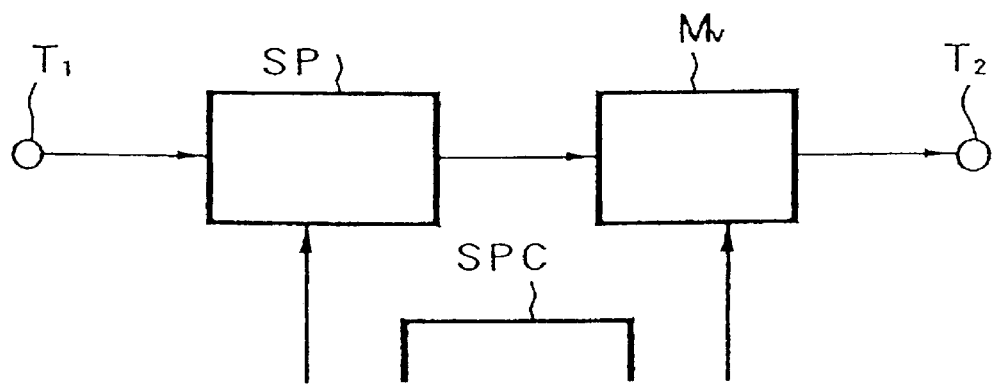
FIG. 11 is a schematic illustration showing the data processing method of the data processing means.

In a data processing method shown in FIG. 11, an image signal of an moving picture is supplied from the input terminal $T_1$ to a sampling means SP. A predetermined number of frame images are sampled at intervals of a predetermined time by means of the sampling means SP. The sampled images are supplied to and stored in a memory MV. The stored images are read, and an image signal is outputted from the output terminal $T_2$.

Furthermore, the data processing means 33 of the PHS server 7 is provided with a conversion means for converting a certain information from the communication terminal 1 into a predetermined multimedia information. That is, when the information is transferred from the communication terminal 1 to the external terminal device (the server or a small-scale communication terminal) connected to the external information communication network 3 or 4, the information (for example, a voice) from the communication terminal 1 is transferred to the PHS server 7. The information is converted into a predetermined multimedia information (for example, text data comprising a character information) by the data processing means 33 thereof. The multimedia information can be transferred from the PHS server 7 to the external terminal device connected to the external information communication network 3 or 4.

Figure 12:
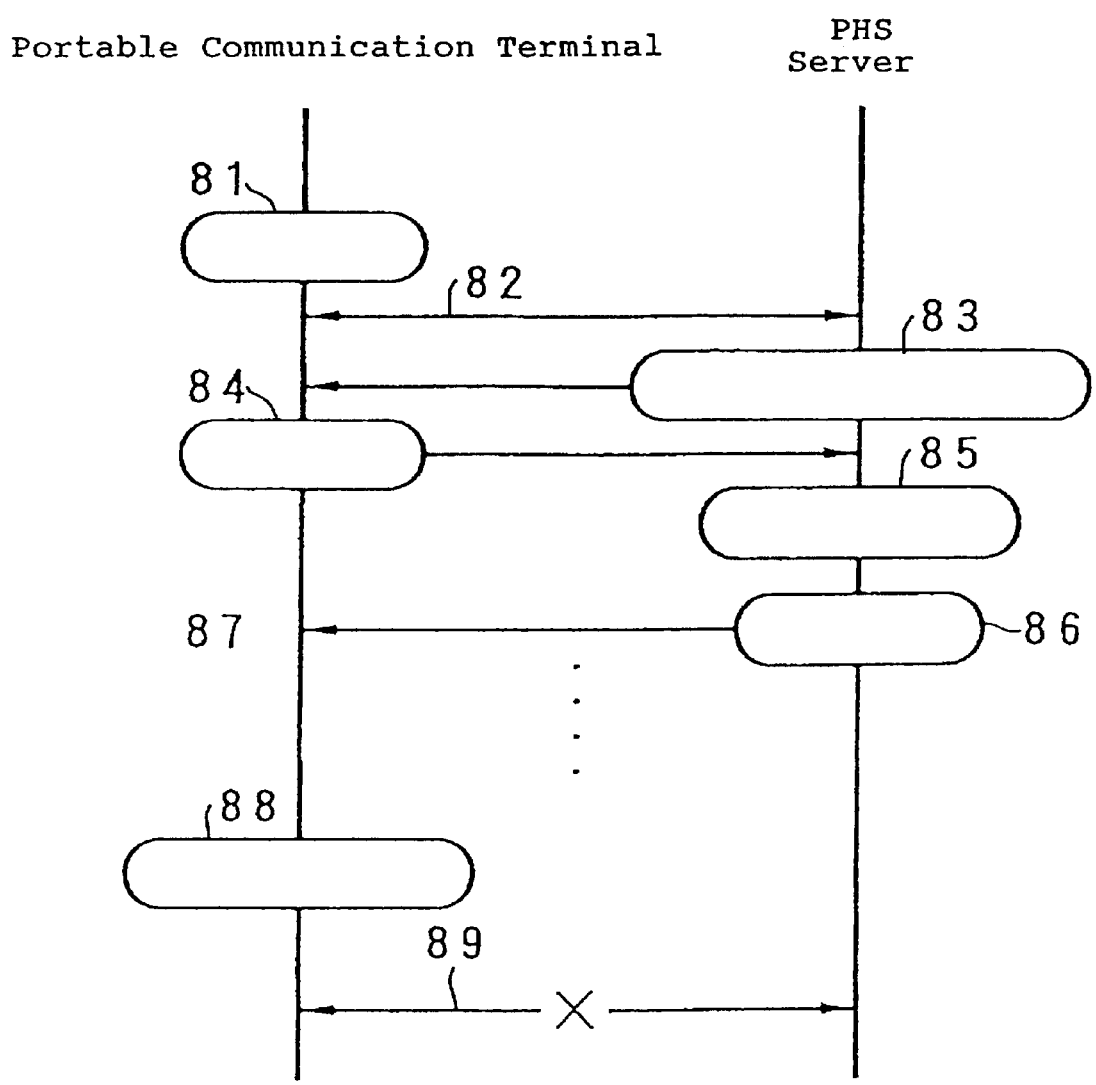
FIG. 12 is a sequence diagram showing the processing between the portable communication terminal and the PHS server.

Next, referring to a sequence diagram in FIG. 12, the operation that the communication terminal 1 accesses to the PHS server 7 connected to the base station 5 in the PHS network 2 will be described. The user presses the additional service button 45 (see FIG. 4) or inputs a voice to the microphone of the voice input/output interface 24 (see FIG. 2), so that the service is requested to the PHS server 7 (81). A communication link (a radio communication link) between the communication terminal 1 and the server 7 is established (82). The PHS server 7 transmits contents information data of the multimedia information in a home page as to the area where the user exists to the communication terminal 1 (83). The transmitted contents information data is displayed in the display means 23 of the interface means 22 of the communication terminal 1. In accordance with the operation of the operation buttons 56 to 60 and 71 to 75 by the user, the CPU 20 transmits an information obtaining request to the PHS server 7 (84). Thus, the PHS server 7 discriminates the requested information contents (85). The information requested by the communication terminal 1 is transmitted to the communication terminal 1 (86). In the communication terminal 1, the information transmitted from the PHS server 7 is displayed in the information display portion 40 of the display means 23 of the interface means 22. The access to other multimedia information stored in the data base 7DB can be accomplished by the user's selecting a menu from the PHS server 7. Thereafter, the processing operations 84 to 86 are repeated, so that the user can obtain a desired multimedia information. After then, when the cancel button 63 is pressed so that a communication link disconnection is requested from the communication terminal 1 to the PHS server 7, the communication between the communication terminal 1 and the PHS server 7 is disconnected.

Next, a connecting point of the PHS server 7 will be described. When the PHS server 7 is connected to the base station 5 or the exchange 6, it is obvious that the PHS server 7 is located near the base station 5 or the exchange 6. Accordingly, the contents of the multimedia information as to the area where the user exists can be easily downloaded from the PHS server 7 to the communication terminal 1. However, when the communication terminal 1 accesses to another network, for example, the server 9 on the public communication network 3, the server 9 attempts to download the contents of the multimedia information in the home page as to the area where the user exists. In this case, since the area where the user exists, that is, the area where the communication terminal 1 exists is not clear, the contents of the multimedia information cannot be downloaded.

Accordingly, when the communication link between the communication terminal 1 and the servers 9, 10 is established, the communication terminal 1 supplies an identification number (for example, an address, a longitude and latitude or the like) of the place where the user using the communication terminal 1 exists, the identification number of the base station 5 or the exchange 6 or the like for the servers 9 and 10. The servers 9 and 10 can transmit, to the communication terminal 1, the contents information of the multimedia information in the home page as to the area near the base station 5 or the exchange 6 connected to the communication terminal 1 of the user.

Figure 13:
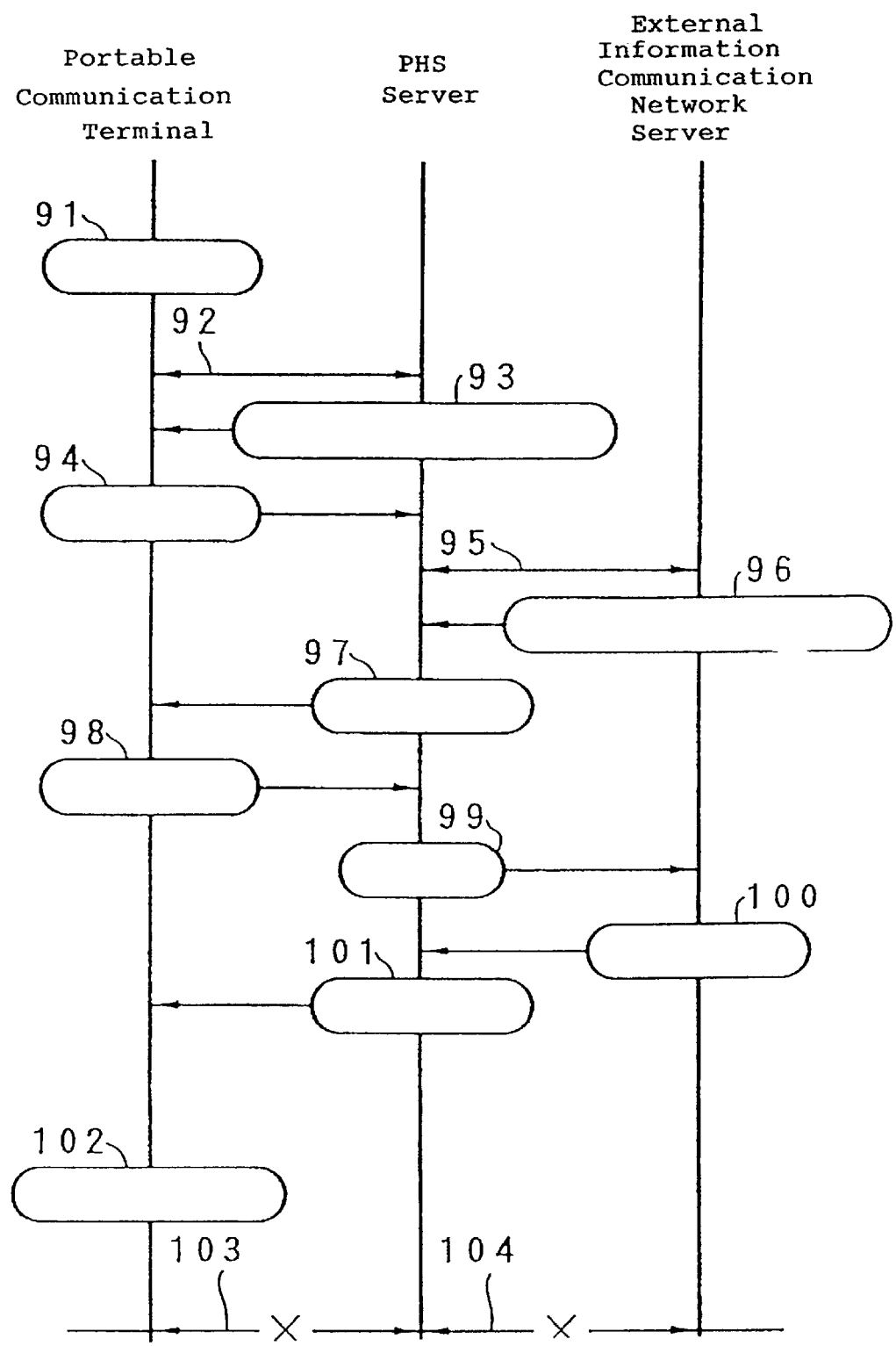
FIG. 13 is a sequence diagram showing the processing between the portable communication terminal and an Internet server.

Next, referring to a sequence diagram in FIG. 13, the operation that the communication terminal 1 accesses to the server 10 (henceforth, referred to as an Internet server) connected to the Internet 4, which is the external information communication network, will be described. The user presses the additional service button 45 (see FIG. 4) or inputs a voice to the microphone of the voice input/output interface 24 (see FIG. 2), so that the communication terminal 1 requests the PHS server 7 for a service (91). The communication link (the radio communication link) between the communication terminal 1 and the server 7 is established (92). The PHS server 7 transmits the contents information of the multimedia information in the home page as to the area where the user exists to the communication terminal 1 (93). The transmitted contents information is displayed in the display means 23 of the interface means 22 of the communication terminal 1.

When the user presses the Internet selection button 56 (see FIG. 5) of the display means 23 so that the access to the Internet server 10 is requested, the communication terminal 1 transmits the address information (for example, the URL) of the Internet server 10 to the PHS server 7 (94). Thus, the PHS server 7 connects the communication terminal to the Internet server 10 in response to the user' request via a TCP/IP (Transmission Control Protocol/Internet Protocol). A communication path is established between the PHS server 7 and the Internet server 10 (95). The Internet server 10 transmits the multimedia information to the PHS server 7 via the HTTP, which is an Internet application protocol (96).

The PHS server 7 filters the multimedia information from the Internet server 10, that is, performs the data processing (the data processing or the data conversion) as described in connection with FIGS. 7 to 11, and then it transmits the multimedia information to the communication terminal 1 (97). The communication terminal 1 transmits the information obtaining request of the Internet server 10 to the PHS server 7 (98). Since the protocol between the communication terminal 1 and the PHS server 7 is different from that between the PHS server 7 and the Internet server 10, the data of the information obtaining request is converted (99). The converted data is transmitted to the Internet server 10. If the protocol between the communication terminal 1 and the PHS server 7 is same as that between the PHS server 7 and the Internet server 10, such a data conversion is not necessary.

The requested multimedia information is transmitted from the Internet server 10 to the PHS server 7 (100). After the multimedia information is filtered (the data is processed) in the same way as the above processing (97), the PHS server 7 transmits the multimedia information to the communication terminal 1 (101). Then, the operations 98 to 101 are repeated, so that the user can obtain a desired multimedia information. After then, when the cancel button 63 is pressed so that the communication link disconnection is requested from the communication terminal 1 to the PHS server 7, the communication links between the communication terminal 1 and the PHS server 7 and between the PHS server 7 and the Internet server 10 are disconnected (103, 104).

Next, the protocol between the communication terminal 1 and the server 7 will be described. As described above, the communication terminal 1 can also access to the Internet server 10 via the PHS server 7. In this case, as described above, the TCP/IP is generally used as the protocol between the PHS server 7 and the Internet server 10. Preferably, a protocol having a high affinity for the TCP/IP is desired to be used as the protocol between the communication terminal 1 and the PHS server 7. As one method, the TCP/IP itself is adopted as the protocol between the communication terminal 1 and the PHS server 7. Here, a unique protocol having the high affinity for the TCP/IP is used as the protocol between the communication terminal 1 and the PHS server 7.

A data transmission capacity in the PHS network 2 ranges from 32 kbits/sec to 128 kbits/sec. The data transmission capacity is much larger than that in other radio communication system. However, since a fading is not sufficiently avoided, a burst error tends to occur, resulting in deteriorating a data transmission quality. Thus, in order to realize a good data transfer in the PHS, it is essential that the burst error is avoided. On one hand, the TCP/IP is the protocol used on the assumption of a high transmission quality. Accordingly, when this protocol is adopted as the protocol between the communication terminal 1 and the PHS server 7, an execute rate of the data transfer is reduced for the above reason. An IP (Internet Protocol) is a protocol for handling a path information by way of a plurality of nodes (servers) in order to carry out the data transfer between the terminal devices or the servers via the communication network. However, since the connection between the communication terminal 1 and the PHS server 7 is considered as 1=1, the IP does not have to be adopted.

A standard protocol used normally for the PHS is employed as a protocol for connecting the lines between the communication terminal 1 and the PHS server 7. After the lines are connected between the communication terminal 1 and the PHS server 7, the data is processed, that is, an interleave, a block-coding and a convolutional coding are carried out. Thus, a bit error rate is reduced, and a re-transmission control is carried out for each frame or block. The processed data is transferred from the PHS server 7 to the Internet server 10 by the use of the TCP, which is a transport layer protocol. In a low quality line such as the line between the communication terminal 1 and the PHS server 7, the data transfer equivalent to the TCP/IP can be carried out.

Figure 14:
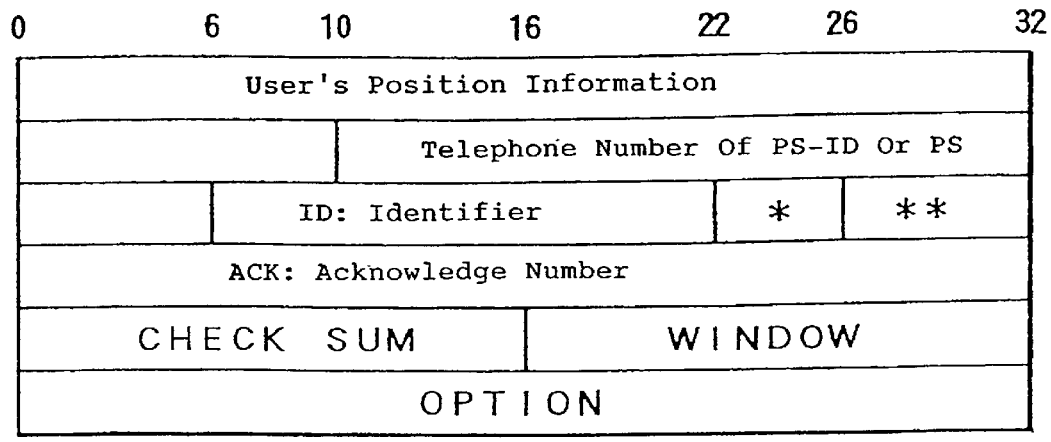
FIG. 14 is a format diagram showing a header of a transport protocol used between the portable communication terminal and the Internet server.

Furthermore, the TCP between the PHS server 7 and the Internet server 10 is required to be slightly changed. That is, FIG. 14 shows information of the changed TCP header. Since the changed TCP header does not use an IP address and a port number, an ID (identifier) is prepared as a means for recognizing a virtual line. Furthermore, in case of a connection form such as the server 9 in which the PHS server 7 is connected to the public communication network 3, since a position information of the user cannot be identified, a PS-ID (personal identifier) (for example, the identifier or the telephone number, the address, the longitude and latitude, the personal identifier and the like of the base station or user) is prepared. Furthermore, the TCP is used so that the data itself to be transmitted from the PHS server 7 to the Internet server 10 is considered as the data in which the information error does not logically generate due to the above described data coding and the like during the transfer between the communication terminal 1 and the PHS server 7. Accordingly, a transmission sequence number and an acknowledge number may be unnecessary. The header includes the data of a header length, a code bit, a check sum, a window, an option and the like.

Figure 15:
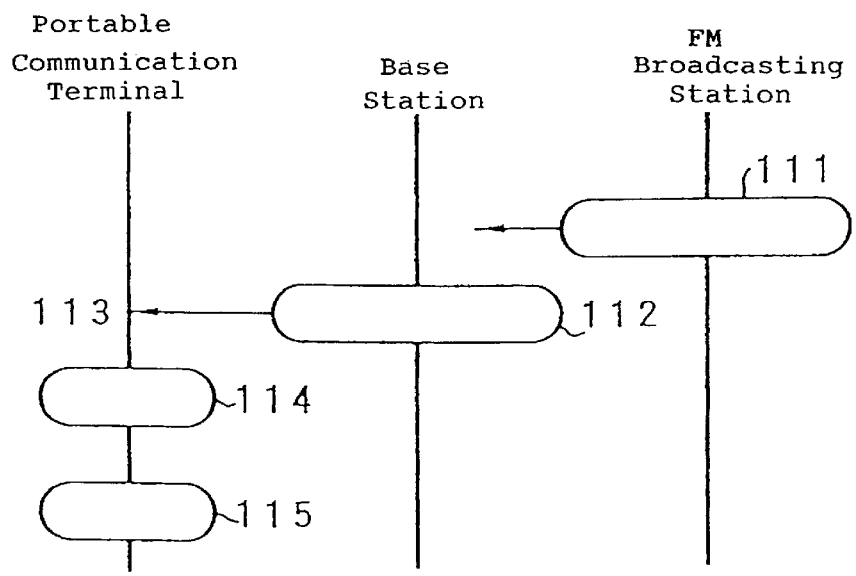
FIG. 15 is a sequence diagram showing a link processing between the portable communication terminal and an FM broadcasting station.

Next, referring to FIG. 15, a link between the communication terminal 1 and the broadcasting station 11 will be described. An FM radio broadcasting station broadcasts various information (for example, an event information) in form of a character information together with a voice information (111). When the various information includes an information (the event information, a news flash and the like) to be broadcasted in a particular area, a radio reception instructing signal (or an on-air signal indicating that the broadcasting station 11 is on air) is transmitted, by the use of a control channel, from the base station 5 of the PHS to the communication terminal 1 (112). The control channel may be a control channel for transmitting a control information necessary to a PHS radio reception or a control channel for transmitting an option information. The radio reception instructing signal (or the on-air signal indicating that the broadcasting station 11 is on air) may be transmitted from the PHS server 7 to the communication terminal 1 via the base station 5.

The communication terminal 1 receives the radio reception instructing signal (or the on-air signal indicating that the broadcasting station 11 is on air) by means of the telephone communication means 26. The radio reception instructing signal is detected by means of the detecting means 28. At this time, for example, the FM broadcast reception operation button 60 is flushed on the display means 23 of the interface means 22 or an alarm generating means (not shown) or an alarm disposed in the interface means 22 is generated, so that the detected radio reception instructing signal (or the on-air signal indicating that the broadcasting station 11 is on air) is reported to the user (113). When the user attempts to receive the broadcast from the broadcasting station 11, the user presses the FM broadcast reception operation button 60 (see FIG. 5). The FM broadcast from the broadcasting station 11 is received by the broadcast receiving means 27. The contents of the event information or the like is displayed in the information display portion 40 (114). When the user desires to know detailed information corresponding to certain contents, the communication terminal 1 accesses to the PHS server 7. The detailed information stored in its data base 7DB is downloaded to the communication terminal 1. In such a manner, since a useful reception can be carried out relative to the user without polling of the communication terminal 1, the information can be more efficiently applied.

The broadcasting station 11 broadcasts the on-air signal indicative of the on-air. The on-air signal is received by the broadcast receiving means 27 of the communication terminal 1. The on-air signal may be detected by the detecting means 28. In this case, for example, the on-air is displayed on the display means 23 of the interface means 22 or the alarm generating means (not shown) provided in the interface means 22 generates an alarm, so that the on-air is reported to the user (113).

Furthermore, when the radio reception instructing signal or the on-air signal is detected by the detecting means 28 of the communication terminal 1, the broadcast receiving means 27 may be automatically in state of reception.

Next, a link between the communication terminal 1 and the personal data base 8 will be described. In the personal data base 8 is stored, for example, a personal information such as a schedule manager, a telephone number, an address book or the like. When the user presses the additional service operation button 45 (see FIG. 4) of the communication terminal 1 and then presses the personal data base selection button 59 (see FIG. 5), a command indicative of the personal data base is generated from the communication terminal 1 and the command is transferred to the personal data base 8, whereby the communication link between the communication terminal 1 and the personal data base 8 is established. When the user presses the operation button 44 of the character such as the Kana, a numeral, the alphabet or the like, the command from the communication terminal 1 is transferred to the personal data base 8. Then, a desired personal information stored in the personal data base can be downloaded to the communication terminal 1.

Next, an access from the server 10 on an external information communication network, for example, the Internet 4 to the PHS server 7 will be described. Since the server 7 has the external communication processing means 34, the server 10 accesses the PHS server 7 by the use of the TCP/IP. The multimedia information stored in the data base 7DB of the PHS server 7 can be browsed.

Figure 3:
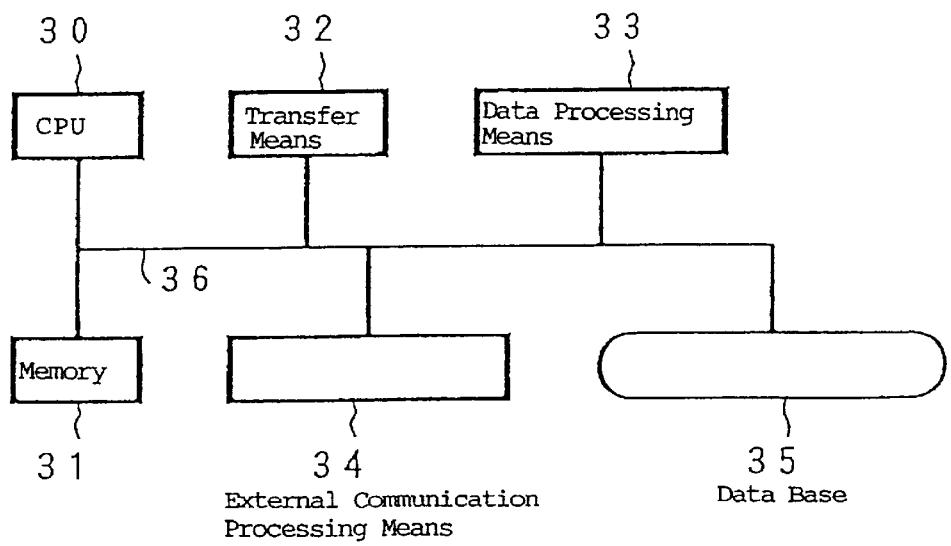
FIG. 3 is a block diagram of a construction example of a portable communication terminal server (PHS server) of the information providing apparatus according to the embodiment.
Figure 16:
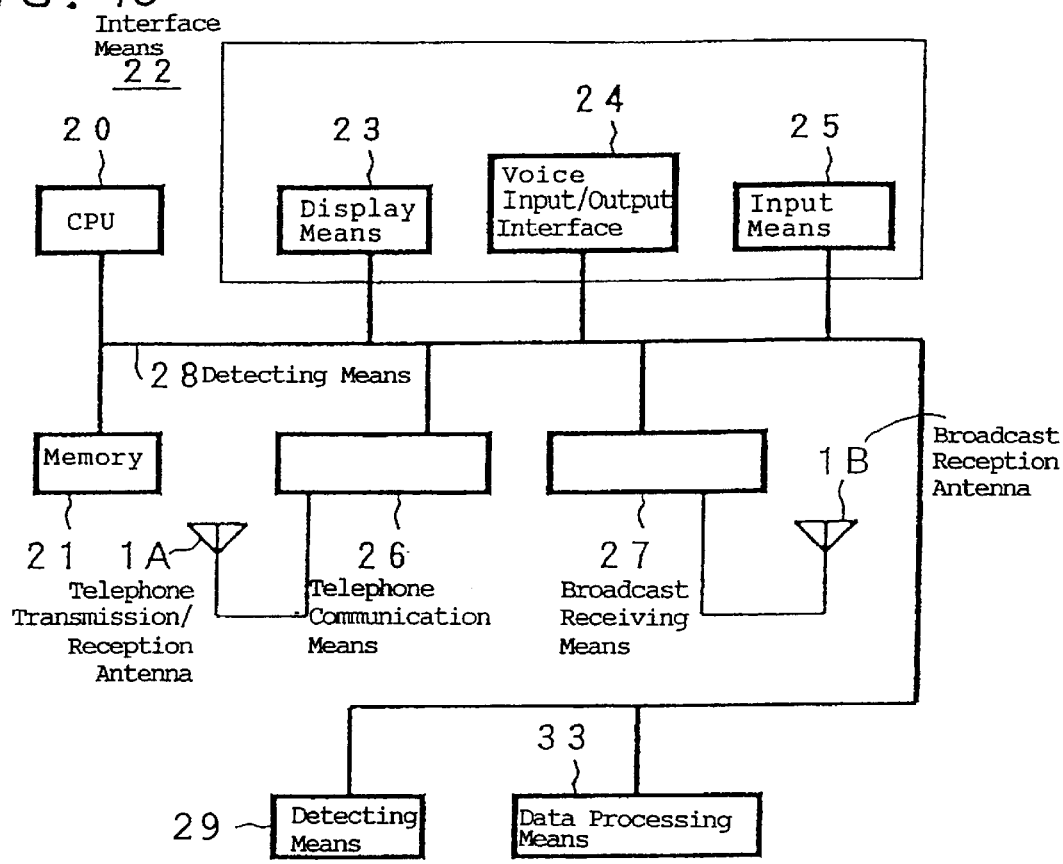
FIG. 16 is a block diagram showing another construction example of the portable communication terminal of the information providing apparatus according to the embodiment.
Figure 17:
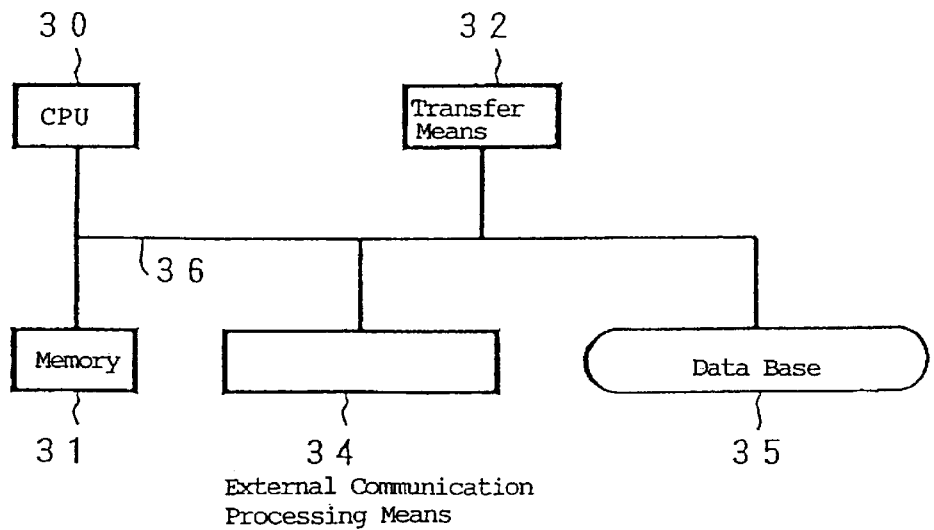
FIG. 17 is a block diagram showing another construction example of the portable communication terminal server (PHS server) of the information providing apparatus according to the embodiment.

In the above embodiment, as shown in FIG. 3, the data processing means 33 is disposed at the side of the PHS server 7. However, as shown in FIG. 16, the data processing means may be disposed at the side of the communication terminal 1. In this case, as shown in FIG. 17, in the construction of the PHS server, the data processing means 33 is omitted.

Figure 18:
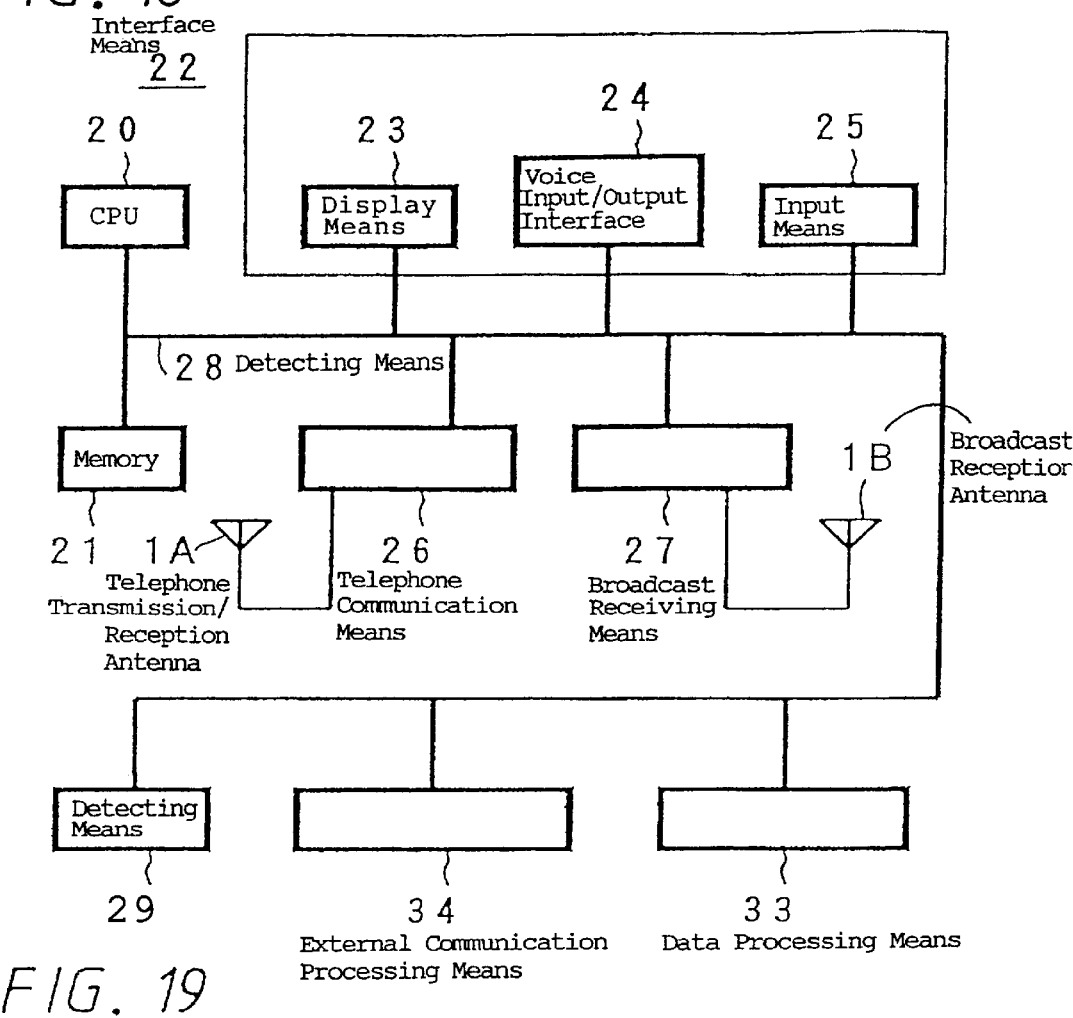
FIG. 18 is a block diagram showing a further construction example of the portable communication terminal of the information providing apparatus according to the embodiment.
Figure 19:
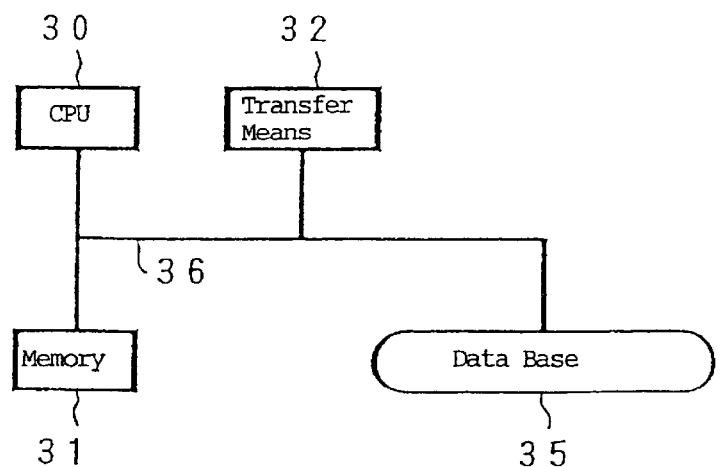
FIG. 19 is a block diagram showing a further construction example of the portable communication terminal server (PHS server) of the information providing apparatus according to the embodiment.
Figure 20:
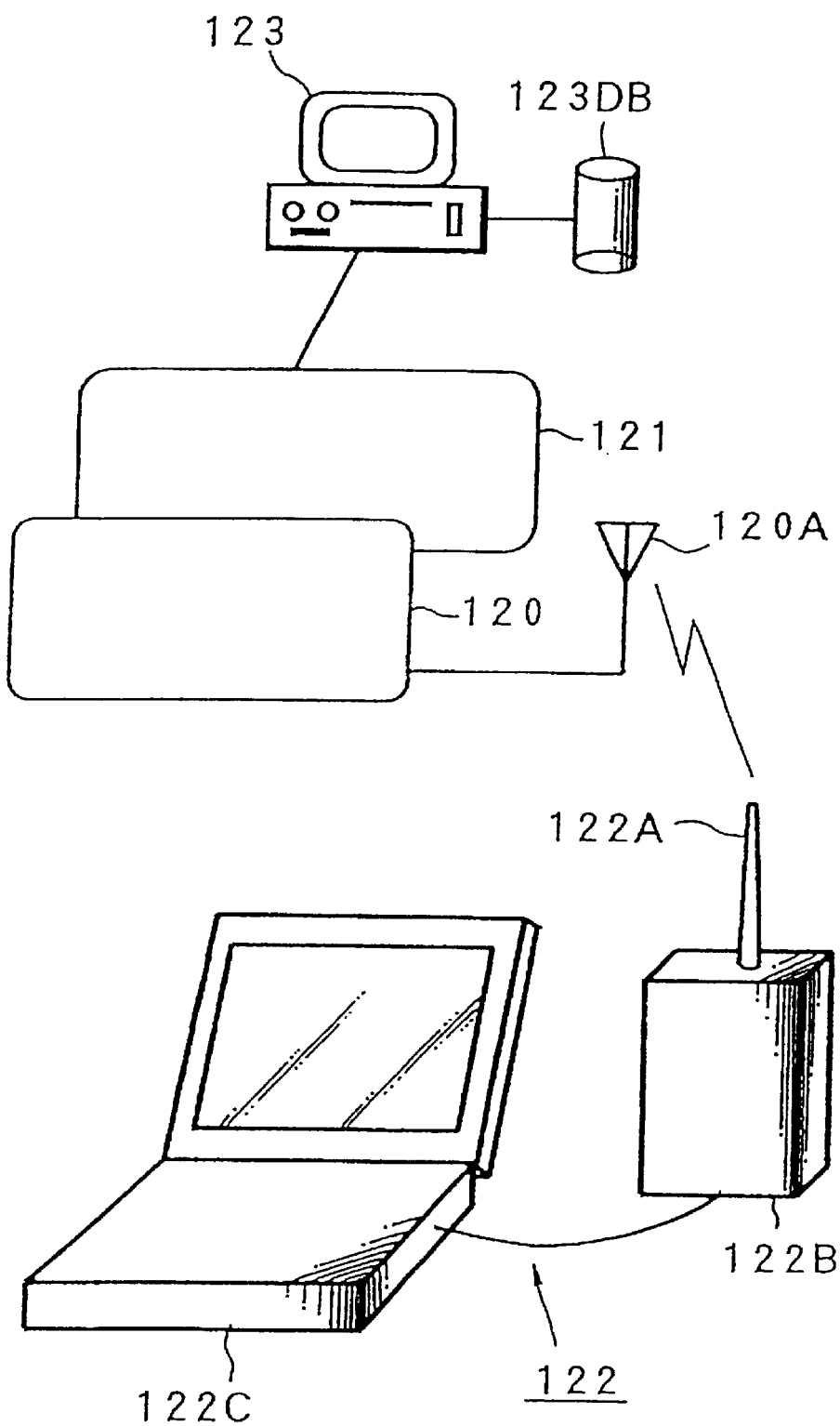
FIG. 20 is a block diagram showing the construction of a conventional information providing apparatus.

In the above embodiment, as shown in FIG. 3, although the data processing means 33 and the external communication processing means 34 are disposed at the side of the PHS server 7, they may be disposed at the side of the communication terminal 1, as shown in FIG. 18. In this case, as shown in FIG. 19, in the construction of the PHS server 7, the data processing means 33 and the external communication processing means 34 are omitted.

According to the present invention, an information providing apparatus comprises a portable communication terminal having a telephone communication means which accesses to a server or a data base connected to a portable telephone system network so as to receive multimedia information from the server or the data base and a human-machine interface means for which the multimedia information is supplied by the telephone communication means, and a portable communication terminal server having a data base in which the multimedia information is stored, an external communication processing means which accesses to the server connected to an external information communication network and receives the multimedia information from the server, a data processing means for processing or converting the multimedia information from the external communication processing means, and a transfer means for transferring the multimedia information from the external communication processing means or the data processing means to the portable communication terminal via the portable telephone system network. Accordingly, the portable communication terminal is small-sized and has a good portability, so that an operability is excellent. By the portable communication terminal, the multimedia information can be obtained from the server connected to a radio telephone communication network or the external information communication network. Furthermore, the obtained multimedia information can be outputted to the human-machine interface.

Furthermore, even if a terminal application software, a viewer or the like is not intentionally installed into the portable communication terminal, the portable communication terminal can access to the communication terminal connected to the external information communication network and can obtain the multimedia information from the communication terminal. Furthermore, after the obtained multimedia information is processed or converted in accordance with the output capability of the human-machine interface, the multimedia information can be outputted to the human-machine interface. Such information providing apparatus and portable communication terminal can be provided.

Furthermore, a transfer control protocol, which is the protocol for the Internet, is mounted to the external communication processing means. Accordingly, it is possible to access to the Internet server, which is the external information communication network.

A hypertext transfer protocol, which is the application protocol for the Internet, is mounted to the external communication processing means. Accordingly, it is possible to access to the Internet server,which is the external information communication network.

Furthermore, a transmission protocol which adds an error correction code so as to control the re-transmission and a transport protocol using a transmission sequence number and an acknowledge number are used as the protocol between the portable communication terminal and the portable communication terminal server. Accordingly, a data transfer equivalent to the transfer control protocol in line having a low quality can be carried out.

Furthermore, the information providing apparatus is provided with a broadcasting means for broadcasting common information within a predetermined area, wherein the portable communication terminal comprises a broadcast reception means for receiving the broadcast from the broadcasting means. Accordingly, the portable communication terminal can also obtain the information from the broadcasting means.

Furthermore, the portable communication terminal comprises a detecting means for detecting an on-air signal indicating that the broadcast is carried out by the external broadcasting means or a broadcast reception instructing signal therefor. Accordingly, since it is not necessary that the broadcast from the broadcasting means is always received, a consumed power is reduced by that extent. When the portable communication terminal is driven by a battery, a longevity of the battery is lengthened.

The portable communication terminal server comprises an identifier transfer means for transferring an identifier indicative of a place where the user using the portable communication terminal exists to the server connected to the external information communication network when the server connected to the external information communication network is accessed by the external communication processing means so as to receive the multimedia information from the server. Therefore, the portable communication terminal can obtain the multimedia information associated with the area where the portable communication terminal exists from the server connected to the external information communication network.

Furthermore, since the data processing means is a conversion means for converting the character information into the voice information, it is possible to obtain the multimedia information from the server connected to the external information communication network by mean of the portable communication terminal. A display screen of the portable communication terminal can be effectively used.

What is claimed is:

1. An information providing apparatus, comprising:
   a portable communication terminal having a telephone communication means operable to access a server and/or a data base connected to a portable telephone system network so as to receive multimedia information from said server and/or data base, and a human-machine interface means operable to receive multimedia information supplied from said telephone communication means; and
   a portable communication terminal server having an external communication processing means operable to access an external server connected to an external information communication network so as to receive multimedia information from said external server, a data processing means for processing or converting multimedia information received from said external communication processing means, and a transfer means for transferring multimedia information from said external communication processing means and/or said data processing means to said portable communication terminal via said portable telephone system network;
   wherein communication between said external communication processing means and said external server is carried out using a modified Transmission Control Protocol/Internet Protocol (TCP/IP) as an administrative protocol and using a Hypertext Transfer Protocol (HTTP) as an application protocol, said modified TCP/IP protocol using a header that does not include an Internet Protocol (IP) address and a port number; and
   wherein communication between said portable communication terminal and said portable communication terminal server is carried out using a protocol having an error correction code, a re-transmission capability, a transmission sequence number and an answer acknowledge number.

2. The information providing apparatus according to claim 1, wherein said apparatus further comprises:
   a broadcasting means for broadcasting common information within a predetermined area; and said portable communication terminal further comprises
   a broadcast reception means for receiving a broadcast from said broadcasting means, a detecting means for detecting an on-air signal indicating that said external broadcasting means is broadcasting or for detecting a broadcast reception instructing signal for instructing said broadcast reception means to receive a broadcast, and an identifier transfer means for transferring an identifier indicative of a place where a user using said portable communication terminal exists to a server connected to said external information communication network when said server connected to said external information communication network is accessed by said external communication processing means so as to transfer multimedia information.

3. The information providing apparatus according to claim 1, wherein said portable communication terminal includes a data base having stored therein multimedia information to be transferred to a second portable communication terminal in accordance with an access from said second portable communication terminal, or multimedia information to be transferred to a communication terminal associated with an external information communication network in accordance with an access from said communication terminal, and wherein said data processing means has a conversion means for converting an information from said portable communication terminal into a predetermined multimedia information.

4. An information providing apparatus, comprising:
   a portable communication terminal having a telephone communication means operable to access a server and/or a data base connected to a portable telephone system network so as to receive multimedia information from said server and/or data base, a data processing means for processing or converting the multimedia information received from said telephone communication means, and a human-machine interface means operable to receive multimedia information supplied from said telephone communication means or said data processing means; and
   a portable communication terminal server having an external communication processing means operable to access an external server connected to an external information communication network so as to receive multimedia information from said external server, and a transfer means for transferring multimedia information from said external communication processing means to said portable communication terminal via said portable telephone system network;
   wherein communication between said external communication processing means and said external server is carried out using a modified Transmission Control Protocol/Internet Protocol (TCP/IP) as an administrative protocol and using a Hypertext Transfer Protocol (HTTP) as an application protocol, said modified TCP/IP protocol using a header that does not include an Internet Protocol (IP) address and a port number; and
   wherein communication between said portable communication terminal and said portable communication terminal server is carried out using a protocol having an error correction code, a re-transmission capability, a transmission sequence number and an answer acknowledge number.

5. The information providing apparatus according to claim 4, wherein said portable communication terminal includes a data base having stored therein multimedia information to be transferred to a second portable communication terminal in accordance with an access from said second portable communication terminal, or multimedia information to be transferred to a communication terminal associated with an external information communication network in accordance with an access from said communication terminal, and wherein said data processing means has a conversion means for converting an information from said portable communication terminal into a predetermined multimedia information.

6. The information providing apparatus according to claim 4 wherein said apparatus further comprises:

a broadcasting means for broadcasting common information within a predetermined area; and said portable communication terminal further comprises a broadcast reception means for receiving a broadcast from said broadcasting means, a detecting means for detecting an on-air signal indicating that said external broadcasting means is broadcasting or for detecting a broadcast reception instructing signal for instructing said broadcast reception means to receive a broadcast, and an identifier transfer means for transferring an identifier indicative of a place where a user using said portable communication terminal exists to a server connected to said external information communication network when said server connected to said external information communication network is accessed by said external communication processing means so as to transfer multimedia information.

7. A portable communication terminal, comprising:

a telephone communication means operable to access a server and/or a data base connected to a portable telephone system network so as to receive multimedia information from said server and/or data base;

an external communication processing means operable to access an external server connected to an external information communication network so as to receive a multimedia information from said external server, wherein communication between said external communication processing means and said external server is carried out using a modified Transmission Control Protocol/Internet Protocol (TCP/IP) as an administrative protocol and using a Hypertext Transfer Protocol (HTTP) as an application protocol, said modified TCP/IP protocol using a header that does not include an Internet Protocol (IP) address and a port number;

a data processing means for processing or converting multimedia information received from said telephone communication means or said external communication processing means; and a human-machine interface means to which multimedia information is supplied from said telephone communication means, said external communication processing means and/or said data processing means.

8. The portable communication terminal according to claim 7 further comprising:

a broadcast reception means for receiving a broadcast from a broadcasting means which broadcasts common information within a predetermined area;

a detecting means for detecting an on-air signal indicating that said external broadcasting means is broadcasting or for detecting a broadcast reception instructing signal for instructing said broadcast reception means to receive a broadcast; and an identifier transfer means for transferring an identifier indicative of a place where a user using said portable communication terminal exists to a server connected to said external information communication network when said server connected to said external information communication network is accessed by said external communication processing means so as to transfer multimedia information.

* * * * *